United States Patent [19]

Rendemonti

[11] 4,020,857

[45] May 3, 1977

[54] APPARATUS AND METHOD FOR PRESSURE CLEANING AND WAXING AUTOMOBILES AND THE LIKE

[76] Inventor: Louis Frank Rendemonti, 700 New York Ave., Point Pleasant Beach, N.J. 08742

[22] Filed: Apr. 13, 1976

[21] Appl. No.: 676,557

[52] U.S. Cl. .................................. 134/7; 15/3; 15/95; 51/320; 118/72; 118/73; 134/6; 427/348; 427/416

[51] Int. Cl.² ........................................ B08B 7/00

[58] Field of Search ................... 134/7, 6; 15/3, 95; 51/320; 118/72, 73; 427/189, 327, 334, 348, 357, 358, 416

[56] References Cited

UNITED STATES PATENTS

| | | | |
|---|---|---|---|
| 2,536,843 | 1/1951 | Dye | 137/7 |
| 3,142,590 | 7/1964 | Hergonson | 134/7 |
| 3,395,412 | 8/1968 | Derwin | 15/3 |
| 3,650,281 | 3/1972 | Hurst | 118/73 |
| 3,702,519 | 11/1972 | Rice et al. | 51/320 |
| 3,715,227 | 2/1973 | Alburger | 427/416 |

*Primary Examiner*—Robert L. Lindsay, Jr.
*Assistant Examiner*—George C. Yeung

[57] ABSTRACT

An apparatus and method are herein described for cleaning and waxing automobiles in commercial "car wash" operations without any need for mechanical buffing or polishing as, for example, with brushes. The surface of the car is first covered with a water soluble, agitated liquid cleaner which has been at least partially foamed. Then, the surface of the car is blasted with water soluble beads under sufficient pressure to apply a frictional cleaning motion to the liquid cleaner, but with insufficient pressure to damage the car surface by excessive abrasion. After the blasting step, the liquid cleaner and water soluble beads are rinsed by the application of a high pressure water spray thereto. If it is desired to wax the car surfaces, microcrystalline beads of dry, water soluble, carnauba wax are blasted against the car surfaces with sufficient pressure to cause frictional buffing and polishing of the surfaces, but insufficient pressure to damage the surfaces with abrasion. Then the car surfaces are rinsed with a water diluted silicone solution to remove any excess non-buffed wax and the surfaces are finally rinsed with clear water to remove any remaining water-solubles.

In one feature of the apparatus, nozzles are provided which both oscillate and are directional so that dispensed material is directed in an oscillating manner at the front portions of the car as the car approaches the nozzle and at the rear portions of the car as the car passes and moves away from the nozzle.

3 Claims, 4 Drawing Figures

APPARATUS AND METHOD FOR PRESSURE CLEANING AND WAXING AUTOMOBILES AND THE LIKE

BACKGROUND OF THE INVENTION

The present invention relates to methods and apparatus for cleaning and waxing and, in particular, relates to a method and apparatus for cleaning and waxing automobiles in commercial "car wash" operations, and the like.

The automated, sequential station, car wash operation has long been in existance without any major improvements in methods or apparatus. Cars to be treated are still sequentially moved past stations where liquid cleaners and liquid waxes are applied thereto and then large brushes of almost every size, shape and description are applied to clean, buff, polish and wax.

The end result of the brushing operation is that bristles tear off to become wedged under molding strips and whole sections of the car are never touched because the brushes are simply not flexible enough to reach such inaccessible surfaces as the side rocker panel. It is virtually impossible to buff, polish and cleam all the visible surfaces of a car using automated brushes. Indeed, surfaces such as door channels and behind moldings cannot be reached even by hand.

It would therefore be advantageous if a method and apparatus were provided which obviated any need for brushing whether it be auomated or manual.

OBJECTS AND SUMMARY OF THE INVENTION

It is therefore an object of the present invention to provide a method and apparatus for cleaning and waxing cars without any need for mechanical buffing or polishing.

It is a further object of the present invention to provide a method and apparatus for cleaning and waxing surfaces of cars which surfaces have been heretofore generally inaccessible to brushing.

At least some of the objects of the invention are achieved by the application of a water soluble, thickened liquid cleaner to the surface of a car. The surface is then blasted with water soluble beads to apply a frictional cleaning motion to the liquid cleaner. The cleaner and water soluble beads are then rinsed from the car surface. It it is desired to wax the car surface, a dry water soluble wax is blasted against the surface to effect frictional buffing and polishing. After this step, excess non-buffed wax is removed by rinsing.

In one aspect of the invention, the blasted materials are dispensed from nozzles which are simultaneously oscillating and directional. The nozzles oscillate back and forth along the direction of movement of the car and are directed toward the front of the car as it approaches the nozzle and at the rear of the car as the car passes and moves away from the nozzle.

THE DRAWINGS

While the invention is particularly pointed out and distinctly claimed in the concluding portion of the specification, a preferred embodiment is set forth in the following detailed description which may be best understood when read in connection with the accompanying drawings, in which:

DETAILED DESCRIPTION

Figure 1:
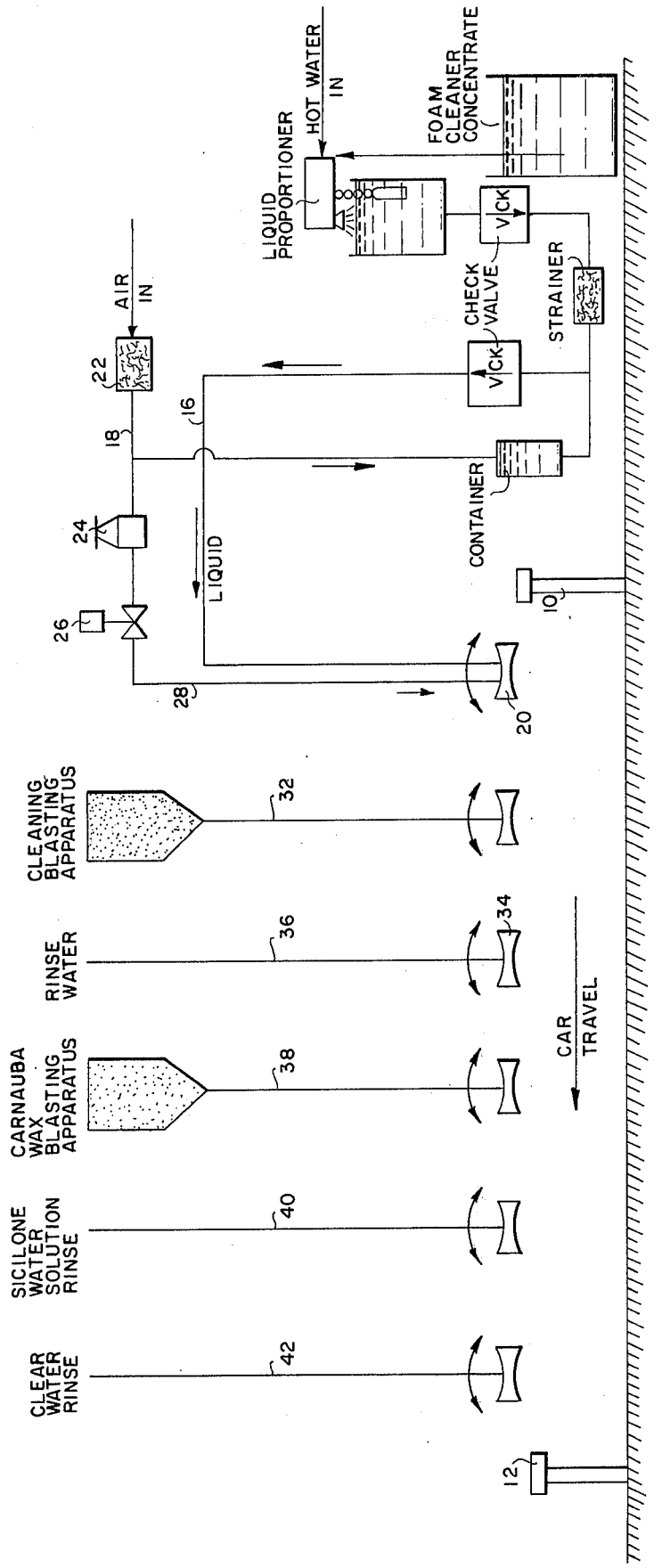
FIG. 1 is a schematic representation of the apparatus and method of the present invention.

Referring now to the drawings in which like-numerals are used to indentify like-parts throughout the various views thereof, FIG. 1 shows the overall preferred embodiment of the present invention.

As can be seen, the apparatus is arranged to accommodate a car which enters at the entrance actuator 10 and exits at the exit actuator 12. Upon entering at actuator 10, the car may actuate a cleaner applying station which is operable to spread under pressure a thickened cleaning compound over the entire surface of the car. The specific cleaner used does not form any part of this invention and any suitable car cleaner, tar solvent or highly alkaline material may be used depending on the specific application.

For example, one cleaner may be more desirable in the summer while another in the winter. Alternatively, if the apparatus is going to be used only to clean tires and hub caps, a very highly alkaline material or a tar solvent may be used which would not be desirable for use on the upper painted surfaces.

It is important, however, that the cleaner be somewhat thickened as, for example, by at least partial foaming so as to be properly acted upon in the next step which involves "blasting". The thickened cleaner, which may take on the appearance of paste, a thickened refrigerated material or a slurry, permits more cleaning movement and friction when blasted, but protects the surfaces of the car from abrasion.

As shown at the cleaner applying station, the cleaner is brought in through line 16 and air is supplied through line 18. Preferably, the liquid cleaner is passed through line 16 by an air-over-liquid combination which is well known in the liquid handling art. The liquid is then sprayed against the car in a manner and through an array of nozzles which will be descrbied in detail later in connection with FIGS. 2–4. For the purposes of this discussion, however, a single nozzle is indicated at 20.

As can be seen, the air (which may also be the source of air for the air-over-liquid pumping arrangement for the liquid cleaner) passes through an air filter 22, a pressure regulator 24 and a solenoid valve 26. When actuated by the entrance actuator 10, the solenoid valve 26 admits air to line 28, which pressure sprays the liquid, and to the nozzles 20 which air agitates and thickens the liquid by at least partial foaming. The cleaning liquid may be heated to above 125 degrees Fahrenheit and agitated to a thickened consistency similar to a shaving cream lather as commercially obtained in aerosol cans.

After the cleaning liquid has been spread over the entire car, the thickened liquid is blasted with dry water-soluble, powder-like beads of soda ash, or the like, which beads are coated with a material such as sodium metasilicate. The beads are propelled into the thickened cleaning liquid and ultimately against the car surface with sufficient pneumatic pressure and force to create a cleaning motion and friction in the liquid which, in turn, loosens and lifts dirt and tar. The pressure and force, however, should be insufficient (depending on the composition and size of the beads) to damage the car surface through abrasion.

This blasting station is indicated at 32 and, once again, a single nozzle 34 is indicated to represent the nozzle array which will be later described. The blasting apparatus may comprise any suitable apparatus of the type generally used to blast with sand. Of course, the pressure utilized should be set in accordance with the parameters set forth in the preceding paragraph. However, the precise pressure and position of the blasting nozzles relative to a car can be readily adjusted by calibration after a few trial runs.

After the thickened cleaner has been blasted by the aforementioned beads at station 32, the car is moved to station 36 where the water soluble blasting beads and cleaner are removed by a clear water rinsing operation. If it is desired to wax the car, it is important that the cleaning and blasting material be completely removed by a thorough rinse.

The aforegoing cleaning method may be performed as a prelude to a waxing operation or may be a complete process in itself. The cleaning method may be for the entire car or for merely a portion thereof. For example, the thickened cleaning liquid may comprise a tar solvent applied to the lower portion of the car such as the rocker panel and wheels. The tar solvent may then be "blasted" by a combination water soluble silicone and carnauba wax bead. Of course, the wax and solvent would then be thoroughly rinsed. Alternatively, if only the grill and bumpers are to be cleaned, the thickened cleaner may comprise a foamd detergent.

Assuming now that the car has been thoroughly cleaned and rinsed at stations 14, 32, and 36 and that it is now desired to wax the car; station 38 is provided.

Station 38 is a blasting station similar to station 32 where pellet-like granuals or beads of wax such as dry carnarba wax are applied to the car under sufficient pressure to create a buffing action with respect to the car surface. The wax pellets are driven onto the car surfaces, behind moldings, door channels and other areas which are impossible to reach by hand. As long as sufficient friction is generated to create a buffing action, a soft frozen slurry containing wax particles or a non-refrigerated paste-like wax compound may be blasted against the car surfaces.

After the wax blasting step at station 38, the car is moved to a rinse station 40 where the excess wax is removed by a solution of silicone and water. Thereafter, the car is thoroughly rinsed with clear water at station 42.

The Nozzle Array

Figure 4:
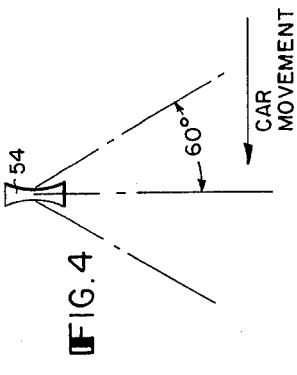
FIG. 4 is a schematic side view of a horizontal row of nozzles used to clean and wax the top surfaces of a car.
Figure 3:
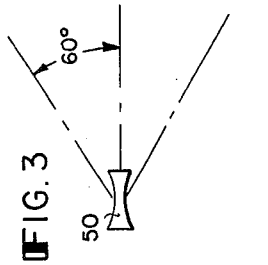
FIG. 3 is a schematic top plan view of a vertical row of nozzles used to clean and wax the side surface of a car.
Figure 2:
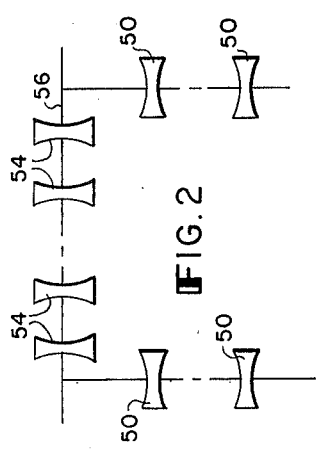
FIG. 2 is a schematic view of an overall nozzle arrangement according to the present invention.

Referring to FIGS. 2-4, a unique nozzle array is schematically represented for applying the wax and cleaning beads and preferably, the silicone rinse.

FIG. 2 shows the general archway defined by four nozzles so disposed for horizontal rotation about a vertical axis. Four more nozzles 54 are mounted for rotation in a verticle plane about horizontal axis 56. The nozzles are arranged to simultaneously oscillate in the respective planes of rotation and to be angularly directable toward a car being moved toward or away therefrom.

FIG. 3 shows one of the vertically stacked nozzles 50 relative to the movement of a car through the various stations of a car wash. While being oscillated in the plane of rotation, the nozzle is rotated to a position generally 60 degress from center and toward an oncoming car. In this manner, the nozzle directs material against the frontal surfaces of the car.

As the approximate mid-point of the car passes to in front of the nozzle 50, the nozzle generally follows until the mid-point begins to move away from the nozzle; whereupon, the nozzle rotates away from center, follows the car and applies material to the rear surface thereof. In this manner, the entire car is thoroughly covered with the desired material and the oscillating motion of the nozzle induces an additional degree of turbulence and frictional movement in the material.

FIG. 4 shows the upper, horizontally alligned and vertically rotatable nozzles 54 which operate essentially the same as the above-mentioned vertically stacked nozzles 50. As the car approaches the nozzles 54, the nozzles are rotated approximately 60° to meet the front end of the car while being simultaneously oscillated in the plane of rotation. As was the case with the vertically stacked nozzles 50, the nozzles 54 rotate to a central position as the mid-point of the car approachs the nozzle. Thereafter, as the mid-point of the car moves away from the nozzle, the nozzle 54 rotates to direct sprayed or blasted material at the rear surfaces of the car. The nozzles 54 are at all times being oscillated to induce additional turbulence and friction.

It can thus be seen that a method and apparatus have herein been described for cleaning and waxing cars without using brushes for buffing, polishing or cleaning. The present invention is uncomplicated and easy to install.

While what has been described herein is a preferred embodiment of the invention, it is of course to be understood that various modifications and changes may be made therein without departing from the invention. It is therefore intended to cover in the following claims, all such modificatons and changes as may fall within the true spirit and scope of the present invention.

What I claim is:
1. A method for treating the surfaces of automobiles in commercial car wash operations, or the like, comprising the steps:
   a. applying a water soluble, thickened liquid cleaner to the surface of the car;
   b. blasting the surface of the car with dry water-soluble pellets comprising soda ash beads coated with sodium metasilicate, said blasting to be applied with sufficient pressure to generate frictional cleaning movement to the thickened liquid cleaner, but applied with insufficient pressure to damage the car surfaces by abrasion; and
   c. rinsing the car surface with water to remove the cleaner and water soluble pellet material.
2. A method according to claim 1 with the additional steps of:
   a. blasting the surface of the car with wax under sufficient pressure to generate a frictional buffing-/polishing action but with insufficient pressure to damage the car surface by abrasion;
   e. rinsing the car surface of excess non-buffed wax by applying a water diluted silicone solution; and
   f. rinsing the car of any remaining water solubles with water.
3. The method according to claim 2, wherein the wax comprises dry, microcrystaline beads of carnauba wax.

* * * * *